United States Patent [19]

Justice

[11] 3,902,007

[45] Aug. 26, 1975

[54] AUDIO AND VIDEO PLURAL SOURCE TIME DIVISION MULTIPLEX FOR AN EDUCATIONAL TV SYSTEM

[75] Inventor: James W. H. Justice, Murrysville, Pa.

[73] Assignee: Westinghouse Electric Corporation, Pittsburgh, Pa.

[22] Filed: June 26, 1973

[21] Appl. No.: 373,727

[52] U.S. Cl. ........................ 178/5.8 R; 178/DIG. 23

[51] Int. Cl.$^2$ ........................ H04N 7/08

[58] Field of Search ............ 178/5.6, 5.8 R, DIG. 23

[56] References Cited

UNITED STATES PATENTS

| | | | |
|---|---|---|---|
| 2,089,639 | 8/1937 | Bedford | 178/5.6 |
| 3,740,463 | 6/1973 | Youngstrom et al. | 178/5.6 |

FOREIGN PATENTS OR APPLICATIONS

| | | | |
|---|---|---|---|
| 531,159 | 12/1940 | United Kingdom | 178/DIG. 23 |

*Primary Examiner*—Howard W. Britton
*Assistant Examiner*—George G. Stellar
*Attorney, Agent, or Firm*—M. P. Lynch

[57] ABSTRACT

One or more audio signals are transmitted and received on conventional video subcarriers during blanked guard-band intervals in the horizontal scan lines forming one, or less than all, of a plurality of branched video pictures. In the branching system, a single T.V. channel is used to transmit and receive two or more separate video pictures by selecting a horizontal scan line from one picture, disregarding successive scan lines thereof until one successively occurring scan line from all of the pictures to be transmitted has been selected and then selecting the next available scan line of the first picture. This processing is then repeated continuously for all the scan lines making up the frame of the pictures. In the preferred form, the blanked guard-band interval occurs only during horizontal scan lines for one of two pictures transmitted. Audio signals are sampled at the standard video scan rate to form audio bursts, two of which are inserted into only those horizontal scan lines having a blanked interval. When one audio signal is transmitted, it is branched into two lines, one including a time delay medium. In the receiver, the previously undelayed audio bursts are time delayed and recombined with the transmitter delayed audio bursts to provide a wide bandwidth audio signal. When bursts of two or more audio signals are received, gating is used to recover the separate audio signals.

23 Claims, 6 Drawing Figures

AUDIO AND VIDEO PLURAL SOURCE TIME DIVISION MULTIPLEX FOR AN EDUCATIONAL TV SYSTEM

BACKGROUND OF THE INVENTION

This invention relates to eliminating blanked guard-band intervals from the horizontal scan lines of every branched video picture transmitted on a single TV channel using line-sharing techniques. By eliminating the blanked guard-band interval from the transmitted scan lines of certain of the branched TV pictures, these pictures can be displayed occupying the full TV screen without having a dark vertical band due to the blanking.

The use of television programming has proven to be a highly significant educational technique. One of the highly objectionable drawbacks to the use of television in this regard has been the need to occupy a number of TV channels for the simultaneous transmission of a plurality of different programs for selection by a student. This is undesirable because not only are there a limited number of TV channels available, but also because the endless switching from channel-to-channel will produce excessive wear or premature failure of conventional tuner assemblies.

Branched TV systems have been provided in the past using different branching techniques whereby a plurality of video pictures can be transmitted over a single TV channel. One such branching system is disclosed in my prior U.S. Pat. No. 3,725,571 which issued on Apr. 3, 1973 to the Assignee of the present application. This prior system provides a multiplex video transmission system for receiving a plurality of *n* separate pictures wherein every nth line of each of the pictures is selected for transmission beginning at a different line and wherein reception of the selected one of the pictures is accomplished by selecting from the plurality of lines transmitted every nth line commencing at the preselected line. The selected line is delayed by a medium having a bandwidth less than the bandwidth of the video pictures and recombining the undelayed selected line so that the selected one of the pictures may be displayed with high quality resolution.

In this form of an educational TV system, the learning process can be greatly improved and more versatile by providing, for example, one or more audio channels containing instructional or even coded information in addition to the sound information provided by the conventional F.M. sound carrier in a TV system. Different forms of educational TV systems have been developed for transmitting a multiplicity of video signals along with audio and/or coding signals on a single television carrier frequency.

One example of such a system is disclosed in my copending application Ser. No. 364,163, filed May 25, 1973 and assigned to the Assignee of the present application. This system features a transmitter and receiver for a plurality of audio and coding signals along with multiple pictures. Bursts of audio signals are modulated in pairs onto the 3.6 megahertz quadrature phase subcarriers in the same way as conventional I and Q video signals are modulated onto the subscriber. The bursts of the audio signal are produced during a blanked guard-band interval defined in the video signal during each horizontal scan line time period, the blanked guard-band interval following the color reference burst in each horizontal scan line or, alternatively, the blanked guard-band interval could be located midway in the time period during which luminance and chrominance video signals are transmitted. In this system the blanked guard-band interval ultimately appeared on the face of the receiving tube as a vertical bar or black band located along the left-hand side of the receiving tube in the first instance and located midway between the vertical edges of the picture tube in the second instance. In a system of this sort, a centrally-located guard-band interval was particularly useful since a different scene was provided for display simultaneously in the four quadrants of the television receiving tube. However, in the TV system disclosed in the aforesaid U.S. Pat. No. 3,725,571, the presence of a dark band along one side of the TV picture of each of the branched pictures may be annoying to the person viewing the picture and undesirable since it will occupy approximately 10% of the total available picture area.

SUMMARY OF THE INVENTION

The present invention provides an improved educational TV system wherein blanked intervals are eliminated during transmitting of at least one branched video picture but retained in other branched pictures whereby the video subcarrier signals are used part of the time to transmit audio signal bursts.

In accordance with the present invention, there is provided in a TV branching system an apparatus for and method of transmitting a wide-band audio signal during blanked guard-band intervals during at least one less than each transmitted video picture.

In a television transmitter, a method of transmitting within a single channel one or more audio signals along with two or more separate video pictures on a video subcarrier whereby the pictures are transmitted by selecting a horizontal scan line from a first picture and then selecting the next scan line for transmission from a second picture which is succeeded by selecting a subsequent occurring scan line from the first picture, the method including the steps of providing at least two audio signal transmission lines, continuously sampling the audio signal in each of the lines to form audio bursts thereof at a rate less than the horizontal scan rate of the video pictures, combining an audio burst from each of the two audio signal lines to form a time-separated train of audio bursts, and modulating the train of audio bursts onto the video subcarrier during a blanked guard-band interval in the horizontal scan lines selected for transmitting at least one and less than all of the separate video pictures.

The present invention further provides an apparatus for and method of recovering audio signal bursts such as those transmitted by the foregoing method and apparatus. The method of recovering such audio signal bursts includes the steps of receiving within a single television channel frequency the video subcarrier corresponding to the two or more separate video pictures; selecting a signal corresponding to horizontal scan lines from the video subcarrier containing the audio bursts during the blanked guard-band interval; branching the signal path of the signal corresponding to selected horizontal scan lines; time delaying the signal corresponding to horizontal scan line signals in one of the signal paths; and gating from the signal corresponding to both of the undelayed and delayed horizontal scan lines, the plurality of audio signal bursts.

These features and advantages of the present invention as well as others will be more fully understood when the following description is read in light of the accompanying drawings, in which.

DESCRIPTION OF THE PREFERRED EMBODIMENTS

Figure 1:
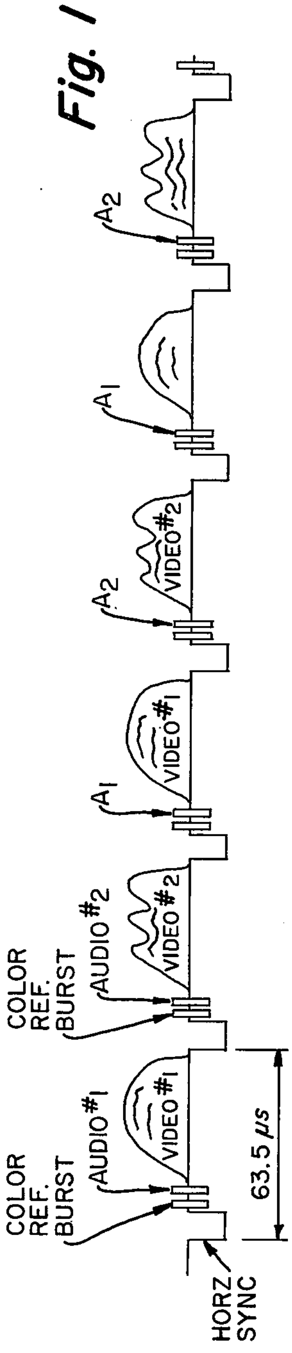
FIG. 1 is a typical waveform of the horizontal scan lines wherein bursts of an audio signal are transmitted during each horizontal scan line in a branched TV system.

FIG. 1 illustrates, typically, horizontal scan lines from two video pictures in a TV branching system. Each horizontal scan line according to standard U.S. practice has a duration of 63.5 microseconds during which a horizontal sync pulse is followed by a color reference burst which is, in turn, followed by a video signal of one horizontal scan line for one of the branched TV pictures. Between the video signal for each picture and the color reference burst, a blanked interval is located during which a burst of an audio signal is transmitted using the subcarrier conventionally used to transmit the video color signal. As clearly apparent from FIG. 1, a series of horizontal scan lines are provided wherein alternate scan lines are selected to provide one of the video signals along with bursts of audio signal. Since the blanking out of a portion of the video signal during each horizontal scan line necessarily involves a reduced portion of the video signal, there occurs as a result a blanked or dark band upon the display tube when either of the video signals are displayed. As indicated previously, this blanked portion occupies approximately 10% of the picture area. The present invention seeks to overcome the blanking out of a portion from each of the branched video pictures by eliminating the blanking interval from one of such pictures and repositioning the audio bursts occurring during the horizontal scan lines thereof to a blanked interval of the other picture where they are arranged as a train of time-divided audio bursts.

Figure 2:
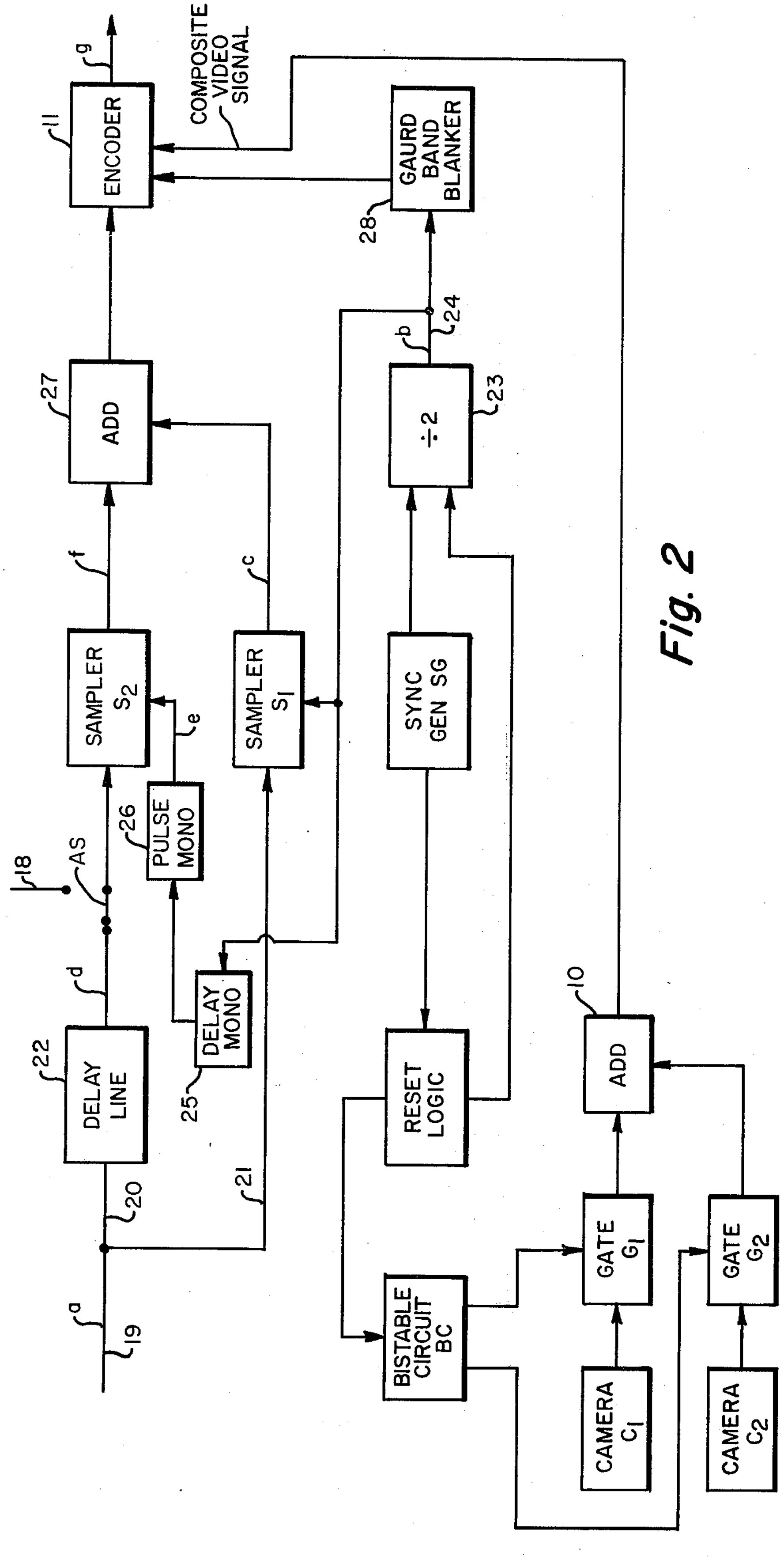
FIG. 2 is a block diagram of circuitry for transmitting an audio signal according to the present invention.

In FIG. 2, a transmitter is shown incorporating TV cameras for transmitting video signals using the line-sharing principle such as disclosed in the aforesaid U.S. Pat. No. 3,725,571. In this regard, as shown in FIG. 2, there is provided a first camera C1 and a second camera C2 for respectively scanning a separate scene. These cameras comprise state-of-the-art monochrome or color TV cameras which are operated according to U.S. standards wherein two fields are interlaced to provide a complete frame of video information. The video outputs from cameras C1 and C2 are respectively applied to gates G1 an G2. These gates are operated in response to gating signals supplied by a bistable circuit BC. A sync generator SG supplies horizontal sync pulses to the bistable circuit BC which causes this circuit to provide control signals that alternately render conductive gates G1 and G2. A reset logic circuit is provided to reset the bistable circuit at the beginning of each frame of video information. That is, the bistable circuit is reset after two fields of scanning are completed which would contain 525 lines according to standard U.S. practice. The gate G1 is rendered conductive, for example, during the odd lines of each field; that is, during lines 1, 3 . . . 525, so that these lines from camera C1 are transmitted through the gate to an add circuit 10. The gate G2 is rendered conductive during time intervals when even numbered lines of each field are supplied from the camera C2. Thus, lines 2, 4 . . . 524 will be translated through the gate to the add circuit 10. The output from the add circuit 10 is the sum of the signals delivered through the gates G1 and G2 by the cameras C1 and C2 as indicated and are delivered to an encoder 11 wherein they are processed and modulated onto a subcarrier prior to modulation onto a radio-frequency carrier for transmission by well-known techniques.

The TV system according to the present invention provides for the transmission and reception of an audio signal in addition to and apart from the audio channel provided by the FM frequency channel. A single audio signal is transmitted by line 19 and has a waveform *a* typically illustrated in FIG. 3.

Figure 3:
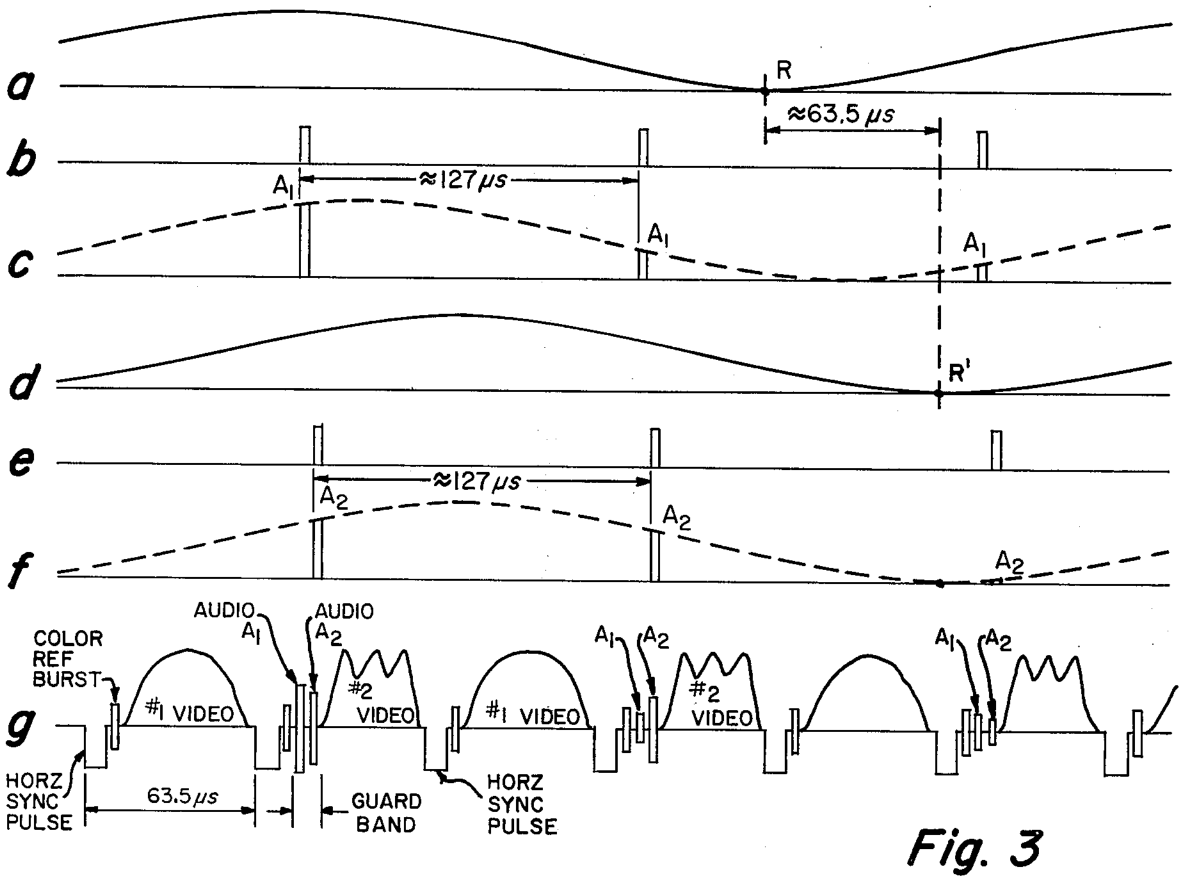
FIG. 3 represents a series of waveforms illustrating the operation of the circuitry shown in FIG. 1.

As point for reference hereinafter, the audio waveform *a* shown in FIG. 3 has a reference point R. This audio signal is branched into lines 20 and 21 with line 20 being connected to a delay line 22 which provides the delay for the audio signal corresponding to approximately one horizontal scan line time period or 63.5 microseconds. The delayed audio signal is shown by the waveform *d* in FIG. 3 wherein it will be observed that the point reference previously referred to in regard to waveform *a* now appears 63.5 microseconds later at R'. The delayed audio signal according to waveform *d* in FIG. 3 is delivered to sampler S2 while the branched audio signal in line 21 is delivered to sampler S1. If desired, an audio switch AS may be actuated to deliver an independent audio signal in line 18 to the sampler S2. The sampler S2 is rendered conductive in response to a series of pulses having a repetitive rate shown by the waveform *b* in FIG. 3. These pulses occur at approximately 127 microseconds apart; that is, every two horizontal scan lines or 2 × 63.5 microseconds. These pulses are provided by the output signal from a divide by two circuit 23 which receives input pulses from the horizontal sync pulse from the sync generator SG. The divide by two circuit 23 also receives a reset pulse from the reset logic to reset the divide by two circuit following the scanning of each frame in the TV picture. The signal pulse from the divide by two circuit is delivered by line 24 to the sampler S1 and to a delay monostable multivibrator 25 which provides a slightly delayed pulse (e.g., 2.0 microsecond or 3.0 microsecond) to a monostable multivibrator 26. The multivibrator 26 produces pulses at 127 microseconds apart (waveform *e* in FIG. 3) to render the sampler S2 conductive to provide audio burst A2 of the delayed audio signal, or the independent audio signal in line 18, as shown by waveform *f* in FIG. 3. The burst A1 of audio signal from sampler S1 and the burst A2 of the audio signal from sampler S2 are combined by an add circuit 27 whereby a train of time divided bursts A1, A2 are then followed 127 microseconds later by a second train time divided bursts A1 and A2. These bursts of audio signal are added within the encoder 11 to the composite video signals from add circuit 10 during a blanked guard-band interval provided in the video signals from camera C2 by a blanker 28 operated in response to the divide by two signal in line 24. This produces an output signal from the encoder having the waveform *g* (FIG. 3) wherein a given horizontal scan line from camera C1 produces a No. 1 video signal preceded by a color reference burst in the usual fashion and a horizontal sync pulse. The next horizontal scan line delivered from the encoder 11 has the form of a horizontal scan line from camera C2 wherein a video portion is preceded by a blanked guard-band interval during which audio bursts A1 and A2 are included in the subcarrier for the video signal. Preceding the guard-band interval is the standard color reference burst and then the horizontal sync pulse. The signal from the encoder 11 is modulated with an RF carrier in the usual manner.

It is now apparent that an audio signal can be transmitted by audio bursts at a 16 kilohertz rate which provides an approximately 8 kilohertz bandwidth without transmitting audio bursts during each horizontal scan line which occur at approximately 16 kilohertz. While two cameras are shown, each providing a video signal for transmission using line-sharing principles, an obvious extension is the use of three or more cameras providing separate video signals each of which is transmitted using the line-sharing technique outlined with respect to the two cameras described above. When three or more video signals are required, depending upon the particular need for a TV system, one of the video signals may be blanked to carry bursts of audio signal or, alternatively, two of the three video signals may contain blanking intervals during which audio bursts are transmitted. In the encoder, the bursts of audio signals may be transmitted onto subcarriers by using the technique outlined in my aforementioned U.S. application Ser. No. 364,163.

Figure 4:
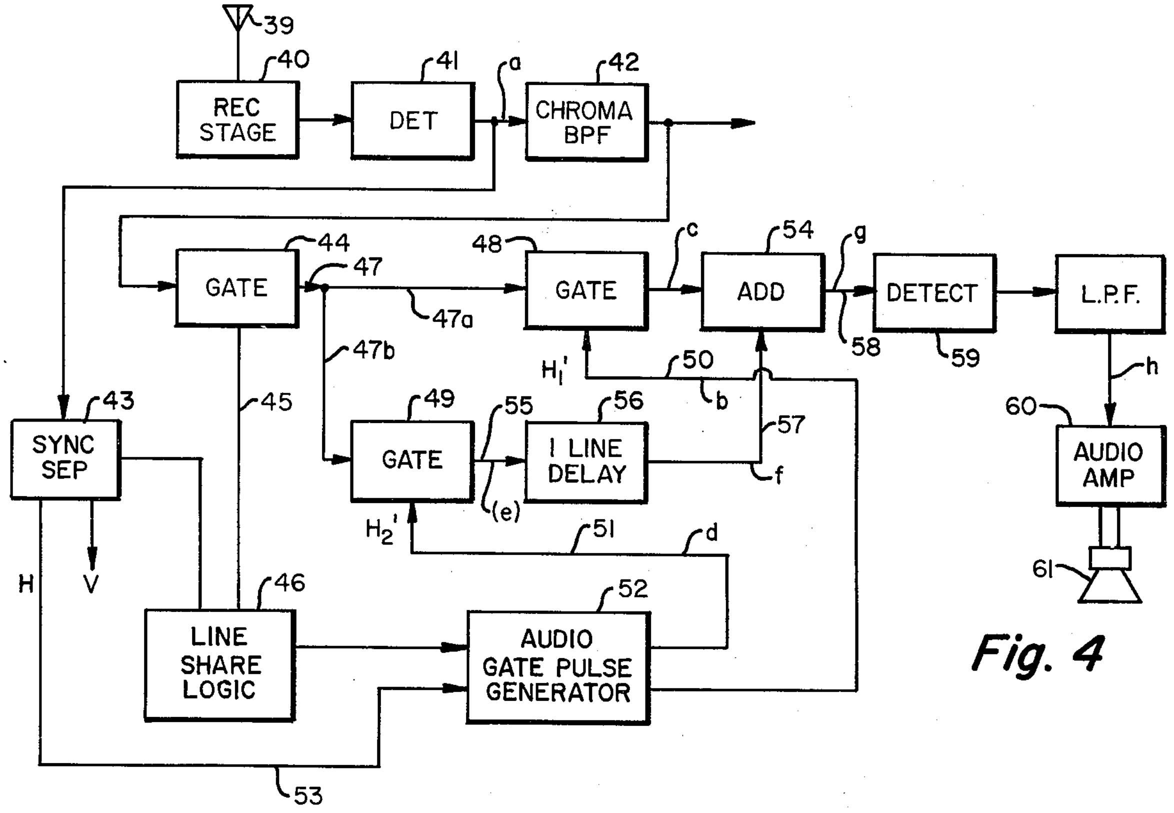
FIG. 4 is a block diagram of a receiver embodying the features of the present invention for recovery of an audio signal transmitted according to the transmitter of FIG. 2.

The present invention further provides a method and apparatus for recovering an audio signal from the audio bursts transmitted by the apparatus shown in FIG. 2 having the typical waveform *g* shown in FIG. 3. Two forms of receiving apparatus are provided which will be described in connection with the waveform *a* in FIG. 5 corresponding to that illustrated by waveform *g* in FIG. 3. In the receiver, according to FIG. 4, the antenna 39 provides a radio-frequency signal to a receiving stage 40 which delivers a signal to a detector 41. The output of the detector has the composite waveform *a* shown in FIG. 5 and it is delivered to a chroma bandpass filter 42 and to a sync separator circuit 43. The signal from the chroma bandpass filter 42 is delivered to a conventional video amplifier (not shown) and further processed according to techniques belonging to the state-of-the-art particularly, for example, those disclosed in the aforesaid U.S. Pat. No. 3,725,571. The signal from the chroma bandpass filter 42 is also applied to a gate 44 which is rendered conductive in response to a signal in line 45 from a line-sharing logic circuit 46. This circuit receives a controlling input signal from the sync separator 43. The signal passed through gate 44 is delivered by a line 47 having branches 47*a* and 47*b* connected to a gate 48 and a gate 49, respectively. Gate 48 is rendered conductive in response to a signal H1′ in line 50 and gate 49 is rendered conductive by a signal H2′ in line 51. The signals H1′ and H2′ are produced by an audio gate pulse generator 52. This generator receives a signal from the line-sharing logic circuit 46 as well as a horizontal sync pulse signal in line 53 from the sync separator 43. The H1′ signal in line 50 renders gate 48 conductive by pulses having the time relation shown by waveform *b* in FIG. 5 wherein these pulses occur at approximately 127 microseconds apart. The H1′ pulses render gate 48 conductive to deliver audio pulses having the same time relation shown by waveform *c* in FIG. 5 to add circuit 54. The pulses H2′ in line 51 occur at 127 microseconds apart as shown by the waveform *d* of FIG. 5 but in a slightly timed displaced relation with respect to the pulses according to waveform *b* in FIG. 5. The H2′ pulses render gate 49 conductive to deliver pulses according to waveform *e* in FIG. 5 in line 55 to a delay line 56 which is selected to have a delay time of approximately one horizontal scan line or 63.5 microseconds. The audio pulses delivered from the delay line 56 are in the time relation shown by the waveform *f* in FIG. 5 and are delivered by a line 57 to the add circuit 54. The output from this add circuit is a series of pulses delivered by line 58 having the time relation shown by waveform *g* in FIG. 5 where it will be observed that the pulses occur at approximately 63.5 microseconds apart wherein a pulse from the gate 48 is followed 63.5 microseconds by a delayed pulse from gate 49 which is, in turn, followed by an undelayed pulse from gate 48, etc. These pulses are delivered to a detector 59 whose output is connected to a low-pass filter to provide an audio signal shown by the waveform *h* in FIG. 5 which represents recovery of the originally transmitted audio signal. The output from the low-pass filter is connected to an audio amplifier 60 which is, in turn, connected to a speaker 61.

Figure 5:
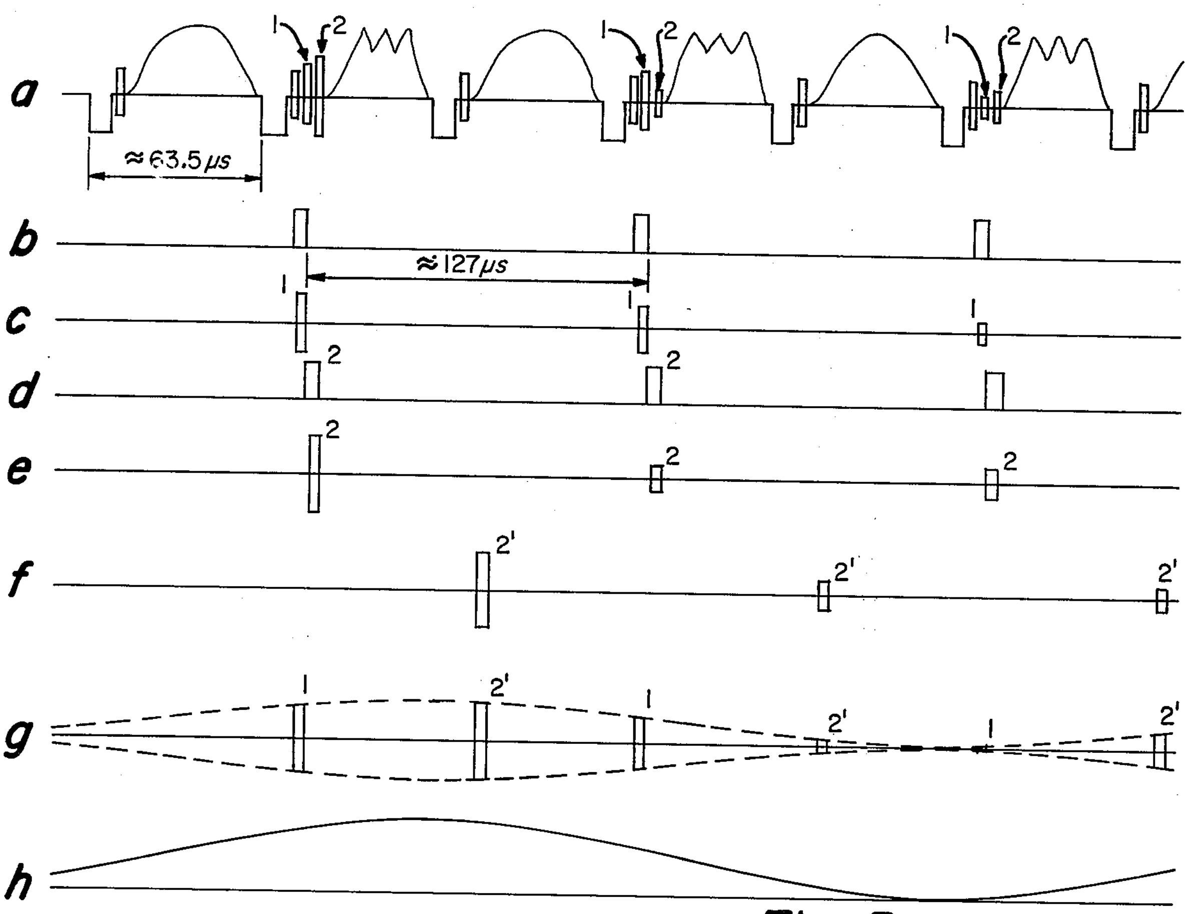
FIG. 5 represents a series of waveforms illustrating the operation of the circuitry shown in FIG. 4.
Figure 6:
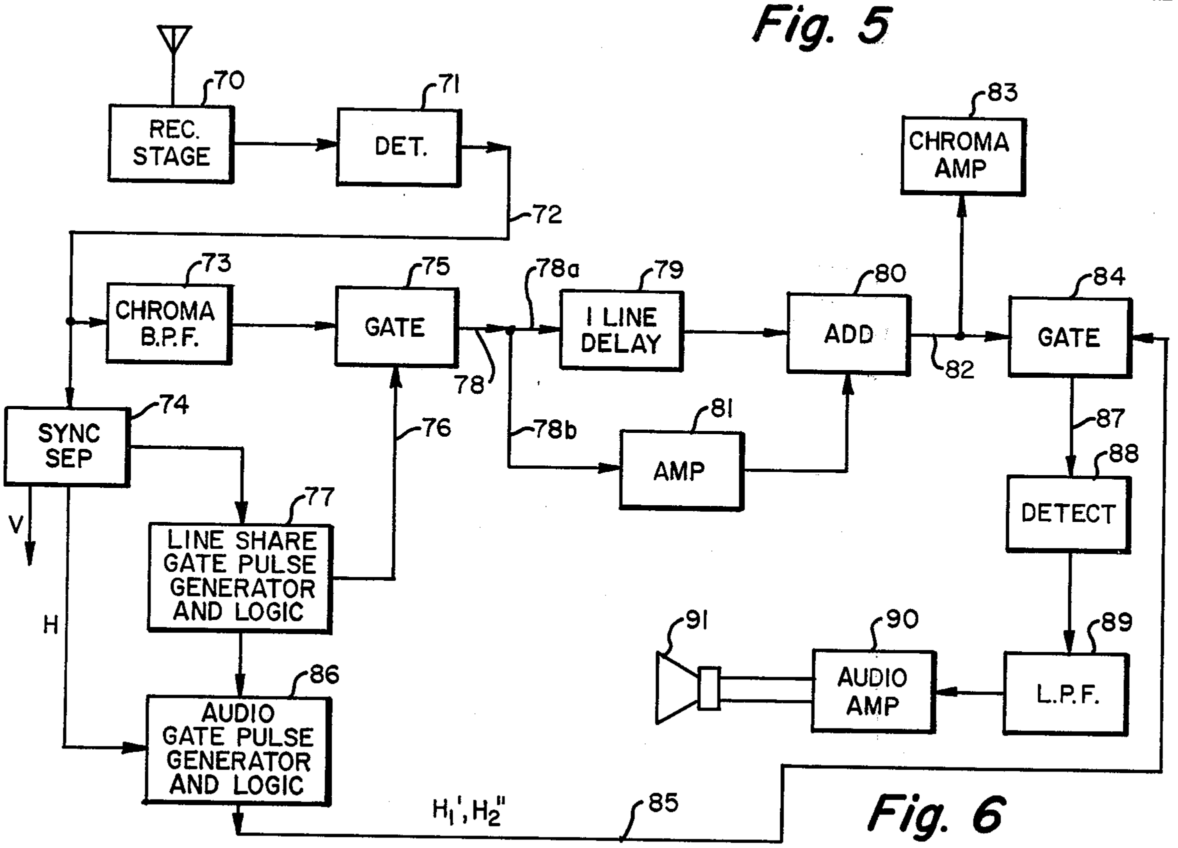
FIG. 6 is a block diagram of a second form of receiver circuitry according to the present invention.

A second form of circuitry is illustrated in FIG. 6 for the detection of the video signal having the waveform *a* in FIG. 5. The circuit illustrated in FIG. 6 makes greater use of the circuitry necessary to receive the line-sharing video signals and it makes use of a "PAL"-type of delay line which is included in the line-sharing receiving circuitry to delay certain of the horizontal scan lines in the video signal approximately 63.5 microseconds to remove picture lininess. This is accomplished by a selected line of one of the pictures being combined with the same line after it is passed through the delay line such as disclosed in U.S. Pat. No. 3,725,571. This delay line can also be used to obtain the necessary delay for repositioning the audio bursts and results in the improvement being obtainable at negligible increase in costs of the receiver. In FIG. 6, the received signal after passing through a receiving stage 70 is delivered to a detector 71 which provides an output in line 72 to a chroma bandpass filter 73 and a sync separator generator 74. The signal from the chroma bandpass filter 73 which has the modulated subcarrier components of waveform *a* shown in FIG. 5, is delivered to a gate 75 rendered conductive in response to a signal in line 76 from a line-sharing gate pulse generator and logic circuit circuitry that receives a controlling signal from the sync separator generator 74. The signal from gate 75 is delivered by a line 78 having a first branch portion 78*a* connected to a PAL delay line 79 selected to have a delayed time constant equal to approximately one horizontal scan line time period or 63.5 microseconds. The output from the delay line is connected to an add circuit 80. The signal in the branched line 78*b* is applied to an amplifier 81 which provides an undelayed video subcarrier signal to the add circuit 80 whereby a selected horizontal scan line by the gate 75 is combined with the same video subcarrier signal of the scan line after it has been delayed 63.5 microseconds. The output from the add circuit is then delivered by a line 82 having a first branch portion connected to a chroma amplifier 83 and a second branch portion connected to a gate 84. The chroma amplifier 83 delivers its signal to a conventional demodulating circuit in a TV receiver, not shown. The gate 84 is rendered conductive in response to signal pulses H1'' and H2'' which are 63.5 microseconds apart plus an additional 2.0 microsecond or 3.0 microsecond, depending upon the time separation between pulses A1 and A2 at the transmitter. The pulses H1'' and H2'' are transmitted by line 85 from an audio gate pulse generator and logic 86 which is controlled in response to the horizontal sync pulses delivered from the sync separator 74 and the signal from the line-sharing gate pulse generator and logic 77. The rendering of the gate 84 conductive during each horizontal scan line time period provides a sequence of audio bursts samples having the time displaced relationship by waveform *g* in FIG. 5 which are delivered by a line 87 to a detector 88 that provides an audio signal to a low-pass filter 89, thereby producing the audio waveform *h* shown in FIG. 5 which is delivered to an amplifier 90. This amplifier drives a loud-speaker 91.

In addition to providing a full picture for one of the branch video signals there is additionally provided other advantages which also accrue from the use of the modified system which are not immediately apparent. The first of these advantages is that there is less departure during the vertical blanking period from the normal FCC waveform. A further advantage stems from the use of video recording and playback equipment wherein one and two head helical tape recorders are used. When the recording head is switched from one track to the next, an interruption of the audio and video signals occurs. Since this interruption occurs once per field, it can cause a 60 hertz buzz in the sound. If the interruption is arranged so as to occur between two audio bursts, the crossover tolerance is ±½ horizontal scan line.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. In a television branching system, a method of transmitting within a single television channel one or more audio signals along with two or more separate and branched video pictures on the same video subcarrier, said method including the steps of:

forming fields of a video signal consisting of selected scan lines from two or more separate video pictures by selecting for transmission a horizontal scan line corresponding to a first video picture and then selecting the next horizontal scan line for transmission from a second picture which is then succeeded by selecting for transmission a subsequent occurring horizontal scan line from said first picture;

providing at least two audio signal lines;

continuously sampling the audio signal in each of said audio signal lines to form audio bursts thereof at a rate less than the occurring rate of selected horizontal scan lines forming the fields of video signal;

combining the audio bursts from the two audio signal lines to form a time-separated train of audio bursts in such a manner so that the formed train of audio bursts occur only during the horizontal scan lines selected for transmitting at least one and less than all of the video pictures;

generating a blanked guard-band interval in the horizontal scan lines forming the video signal frames of at least one and less than all of said two or more pictures and at a time apart from the horizontal retrace period including occurring horizontal sync pulses in such a manner that a displayed image of at least one but less than all of the pictures will include blanked video intelligence corresponding to the blanked guard-band interval; and modulating the selected lines of said video pictures onto a video subcarrier while modulating said train of audio bursts onto the same video subcarrier during the generated blanked guard-band interval in the video signal portion of horizontal scan lines selected for transmitting at least one and less than all of the separate video pictures.

2. The method according to claim 1 including the additional step of delaying the audio signal in one of said audio signal transmission lines for a period of time corresponding to at least one video scan line time period.

3. The method according to claim 2 wherein said signal transmission lines each receive the same audio signal.

4. The method according to claim 1 wherein said signal transmission lines each receive a separate and independent audio signal.

5. The method according to claim 1 wherein the continuous sampling of the audio signal in each of said signal transmission lines produces audio bursts occurring at different times.

6. The method according to claim 5 wherein the continuous sampling of the audio signal in each of said signal transmission lines produces an audio burst for every two video scan lines transmitted.

7. In a television branching system, the method of recovering from a video subcarrier within a single channel frequency in a receiver at least one audio signal transmitted along with at least one and less than all of two or more separate and branched video pictures, said audio signals being transmitted in the form of a plurality of audio bursts during a blanked guard-band interval which occurs within the video intelligence portion of the horizontal scan lines selected to transmit at least one and less than all of two or more separate and branched video pictures, said method including the steps of:

receiving said video subcarrier modulated with said two or more separate and branched video pictures of which at least one and less than all contain a blanked band in the video when displayed on the face of a television display tube, said blanked band corresponding to said blanked guard-band interval;

selecting a video signal from said video subcarrier corresponding to horizontal scan lines forming only the separate and branched video pictures which when displayed include said blanked band and thereby selecting only the horizontal scan lines including said plurality of audio bursts during the blanked guard-band interval within the video intelligence portion of the scan lines;

branching the signal path of the selected signal which includes said plurality of audio bursts during the blanked guard-band interval;

time delaying the selected signal in one of the branched signal paths;

gating the signals corresponding to both the delayed and undelayed signals in the branched signal path to recover said plurality of audio bursts from the blanked guard-band intervals therein;

detecting the gated audio bursts to form an audio signal; and amplifying the formed audio signal to drive a sound transducer.

8. The method according to claim 7 wherein said time delaying the signal corresponding to the horizontal scan line signal in one of the signal paths occurs for a period of time corresponding to the time period of a horizontal scan line.

9. The method according to claim 7 including the step of detecting said plurality of audio bursts to form an audio signal.

10. The method according to claim 7 wherein said plurality of audio signal bursts are gated from the signal corresponding to the undelayed horizontal scan line at intervals of time occurring in a time displaced manner from the intervals of time for gating the signal corresponding to the delayed horizontal scan lines.

11. The method according to claim 7 wherein said gating the signal occurs in a manner to supply a signal for said time delaying.

12. The method according to claim 9 including the step of amplifying the signal produced from said plurality of audio bursts to form an audio output signal for driving a sound transducer.

13. In a television branching system, an apparatus to transmit within a single television frequency channel one or more audio signals along with at least one and less than all of two or more separate and branched video pictures using the same video subcarrier, said apparatus comprising:

gate means including an add circuit to form fields of a video signal corresponding to selected horizontal scan lines for transmitting branched video pictures, said means being operable to select a horizontal scan line corresponding to a first video picture and then selecting the next horizontal scan line for transmission from a second picture which is then succeeded by selecting a subsequently occurring horizontal scan line from said first picture;

means for sampling said audio signals to produce trains of time-separated audio bursts which trains of audio bursts occur at a rate less than the occurring rate of horizontal scan lines selected to form the fields of branched audio pictures;

blanking means responsive to control pulses occurring at a rate less than the horizontal scan rate of said fields of video signal, said blanking means being coupled in the video signal path of at least one and less than all of the branched video signals for defining a guard-band blanked interval within the video intelligence portion of the horizontal scan lines selected by said gate means to form at least one and less than all of the branched video pictures; and means including an encoder receiving the trains of time-separated audio bursts and receiving the signal corresponding to the branched video pictures for modulating the same video subcarrier with both the video signal corresponding to selected horizontal scan lines forming the branched video picture and the train of time-separated audio bursts only during said guard-band blanked interval.

14. The apparatus according to claim 13 wherein said means for sampling include first and second audio signal samplers and said means for controlling including monostable multivibrator means for rendering said second sampler conductive, said apparatus further comprising means receiving horizontal sync pulses for producing pulses to control said first sampler and said monostable multivibrator.

15. The apparatus according to claim 14 further comprising delay means in the path of the audio signal delivered to one of said audio signal samplers.

16. The apparatus according to claim 14 wherein said first and second audio signal samplers receive separate and independent audio signals.

17. The apparatus according to claim 14 further comprising means for combining the pulses delivered from said first and second samplers to form said train of time-separated audio bursts.

18. The apparatus according to claim 13 further comprising a means for receiving said audio signal bursts transmitted on said video subcarrier and means for detecting said audio signal bursts for recovering an audio signal represented thereby.

19. The apparatus according to claim 18 further comprising means for delivering video signals to said means for encoding in the form of a selected horizontal scan line from one of said separate video pictures followed by a selected horizontal scan line from a second of said separate video pictures which is succeeded by a subsequent horizontal scan line from said first picture.

20. In a television branching system, an apparatus for receiving within a single television channel one or more audio signals along with two or more branched and separate video pictures on the same video subcarrier, said audio signals being transmitted in the form of a plurality of audio bursts during a blanked guard-band interval which occurs within the video intelligence portion of the horizontal scan lines selected a transmit at least one and less than all of two or more of the separate and branched video pictures, said apparatus comprising:

means for detecting said video subcarrier modulated with said two or more separate and branched video pictures of which at least one and less than all contain a blanked band in the video intelligence portion when displayed on the face of a television display tube, said blanked band corresponding to said blanked guard-band interval containing a plurality of audio bursts;

gate means coupled to said means for detecting;

line sharing pulse generator means for controlling said gate means to select from the video subcarrier only the horizontal scan lines containing the blanked guard-band interval and forming at least one and less than all of the branched and separate video pictures;

means coupled to said gate means for branching into separate signal paths the signal corresponding to the selected horizontal scan lines having the plurality of audio bursts within the blanked guard-band interval;

means coupled in one of the branched signal paths for delaying the conducted signal which includes at least a plurality of audio bursts;

gate means for selecting audio bursts from the signals conducted in the branched signal paths;

means for adding the audio burst signals from both branched signal paths; and detector means receiving the added audio burst signals for producing an audio signal corresponding to the audio signal bursts.

21. The apparatus according to claim 20 further comprising:

filter means for receiving the audio signal from said means for detecting an audio signal; and means for amplifying the signal from said filter means.

22. The apparatus according to claim 20 wherein said gate means for selecting includes:

first gate means in one signal path formed by said means for branching;

second gate means in the other signal path formed by said means for branching; and audio gate pulse generator means for producing signals to render said first and second gates conductive to said audio bursts occurring during said blanked guard-band interval.

23. The apparatus according to claim 20 wherein said gate means for selecting includes:

means for gating the signal from said means for adding; and audio gate pulse generator means for rendering said means for gating conductive to said audio burst occurring during said blanked guard-band interval.

* * * * *